(12) United States Patent
Kim et al.

(10) Patent No.: US 10,877,308 B2
(45) Date of Patent: Dec. 29, 2020

(54) DISPLAY DEVICE

(71) Applicant: LG Display Co., Ltd., Seoul (KR)

(72) Inventors: WonTae Kim, Paju-si (KR); SungSik Son, Paju-si (KR); JiCheol Son, Paju-si (KR); Chanhyeok Park, Paju-si (KR); Jongseok Cha, Paju-si (KR); WonJong Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/529,431

(22) Filed: Aug. 1, 2019

(65) Prior Publication Data

US 2020/0192148 A1 Jun. 18, 2020

(30) Foreign Application Priority Data

Dec. 18, 2018 (KR) .................. 10-2018-0164342

(51) Int. Cl.
*G02F 1/1335* (2006.01)
*G02F 1/1333* (2006.01)
*G02F 1/13357* (2006.01)

(52) U.S. Cl.
CPC .. *G02F 1/133512* (2013.01); *G02F 1/133308* (2013.01); *G02F 1/133602* (2013.01); *G02F 2001/133541* (2013.01)

(58) Field of Classification Search
CPC ................................. G02F 1/133512
See application file for complete search history.

(56) References Cited

U.S. PATENT DOCUMENTS

2017/0059771 A1* 3/2017 Yuki .................... G02B 6/0088
2017/0123452 A1* 5/2017 Evans, V .......... H01L 27/14645
2019/0331960 A1* 10/2019 Li ..................... G02F 1/133512

* cited by examiner

*Primary Examiner* — Edmond C Lau
(74) *Attorney, Agent, or Firm* — Fenwick & West LLP

(57) ABSTRACT

A display device includes a backlight unit, a liquid crystal panel installed on the upper portion of the backlight unit, and a camera hole that passes through the backlight unit and the liquid crystal panel. A camera is inserted into the camera hole, and a cover glass is attached to the liquid crystal panel, the cover glass covering the camera hole. A light-leakage prevention means is provided on the cover glass to prevent light leakage into the camera hole. The camera hole passes through the backlight unit and the liquid crystal panel in a hole-in-display type, and prevents light leakage into the camera hole and improves the appearance quality while increasing the resolution of the camera.

20 Claims, 11 Drawing Sheets

DISPLAY DEVICE

CROSS-REFERENCE TO RELATED APPLICATIONS

This application claims priority to Republic of Korea Patent Application No. 10-2018-0164342, filed on Dec. 18, 2018, the disclosure of which is incorporated herein by reference in its entirety.

BACKGROUND

Field of the Disclosure

The present disclosure relates to a display device, and more particularly, to a display device of a Hole In Display type having a camera hole in a display.

Description of the Related Art

As mobile devices such as smart phones, pads, and notebooks evolve, the demand for displays is gradually increasing. In recent years, it is moving toward a full-screen display that increases the sense of immersion and covers the front surface in order to benefit from the size and design of the mobile device.

For example, if only a camera hole remains on the front display and the remainder is all hidden, the mobile device can be a simple shape. When the front display becomes simple, the non-screen region is reduced, such that the sense of immersion is enhanced when viewing the image.

SUMMARY

An object of the present disclosure is to provide a display device, which applies a hole-in-display type having a camera hole in a display, thereby reducing light leakage into the camera hole and having excellent appearance quality.

The present disclosure includes a display device with a backlight unit and a liquid crystal panel on the backlight unit. A hole is in both the backlight unit and the liquid crystal panel, and a camera is positioned in the hole. A cover glass is attached to the liquid crystal panel, and the cover glass covers the hole. A light-leakage prevention means is in contact with the cover glass, where the light-leakage prevention means reduces light leakage into the hole.

In one embodiment, the light-leakage prevention means includes a hole guide in contact with the cover glass and positioned in the hole. The hole guide surrounds the camera and reduces the light leakage in the camera.

In one embodiment, the hole guide includes a body portion having a hollow cylindrical shape with an outer diameter corresponding to a diameter of the hole. The hole guide also includes a flange at one end of the body portion, the flange attached to the cover glass and extending away from the hole along the cover glass in a direction that is perpendicular to the body portion.

In one embodiment, the hole guide includes a light-leakage prevention layer that has one or more layers of black material, where the first light-leakage prevention layer is positioned between the flange and the cover glass.

In one embodiment, an antireflective layer is on a portion of the cover glass, the antireflective layer covering the hole.

In one embodiment, the light-leakage prevention means includes a fixing groove recessed in the cover glass, where a front end of the camera is inserted into the fixing groove. A thickness of a portion of the cover glass overlapping the fixing groove is less than a thickness of a portion of the cover glass that is non-overlapping with the fixing groove.

In one embodiment, a light-leakage prevention layer is on an inner wall of the fixing groove in the cover glass.

In one embodiment, a portion of the light-leakage prevention layer is between the liquid crystal panel and the cover glass.

In one embodiment, the fixing groove has a same diameter as an outer diameter of the camera.

In one embodiment, the light-leakage prevention means includes a cover bottom, where a first portion of the cover bottom is on a surface of the backlight unit and a second portion of the cover bottom bends into the hole.

In one embodiment, the second portion of the cover bottom extends along a portion of a length of the hole through the backlight unit.

In one embodiment, a glue wall covers the second portion of the cover bottom in the hole.

In one embodiment, a polarizer covers the camera hole, where a surface of the glue wall contacts the polarizer.

In one embodiment, the display device further includes a polarizer overlapping the hole and a cover film is on the polarizer. The cover film overlaps the hole, and a surface of the glue wall contacts the cover film.

In one embodiment, the cover film is a polyethylene terephthalate (PET) film.

In one embodiment, the display device further includes a polarizer on the back unit. The polarizer extends into the hole and contacts a surface of the glue wall.

In one embodiment, a free space is formed above a portion of the polarizer that extends into the hole and the glue wall.

The present disclosure includes a display device with a backlight unit in an active area of the display device, where the active area of the display device displays an image. The display device also includes a liquid crystal panel on the backlight unit. A hole is in both the backlight unit and the liquid crystal panel, and the hole is in the active area. A camera is positioned in the hole. A light-leakage prevention means at least partially surrounds the hole, the light-leakage prevention means reducing light leakage into the hole.

In one embodiment, the display device further includes a cover glass attached to the liquid crystal panel, where the cover glass covers the hole.

In one embodiment, the light-leakage prevention means includes a hole guide in contact with the cover glass and positioned in the hole. The hole guide surrounds the camera and reduces the light leakage in the camera.

In one embodiment, the hole guide includes a body portion having a hollow cylindrical shape with an outer diameter corresponding to a diameter of the hole. The hole guide also includes a flange at one end of the body portion, the flange attached to the cover glass and extending away from the hole along the cover glass in a direction that is perpendicular to the body portion.

In one embodiment, the light-leakage prevention means includes a fixing groove recessed in the cover glass, where a front end of the camera is inserted into the fixing groove. A thickness of a portion of the cover glass overlapping the fixing groove is less than a thickness of a portion of the cover glass that is non-overlapping with the fixing groove.

In one embodiment, the light-leakage prevention means includes a cover bottom, where a first portion of the cover bottom is on a surface of the backlight unit and a second portion of the cover bottom bends into the hole.

In one embodiment, a glue wall covers the second portion of the cover bottom in the hole.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

Figure 1:
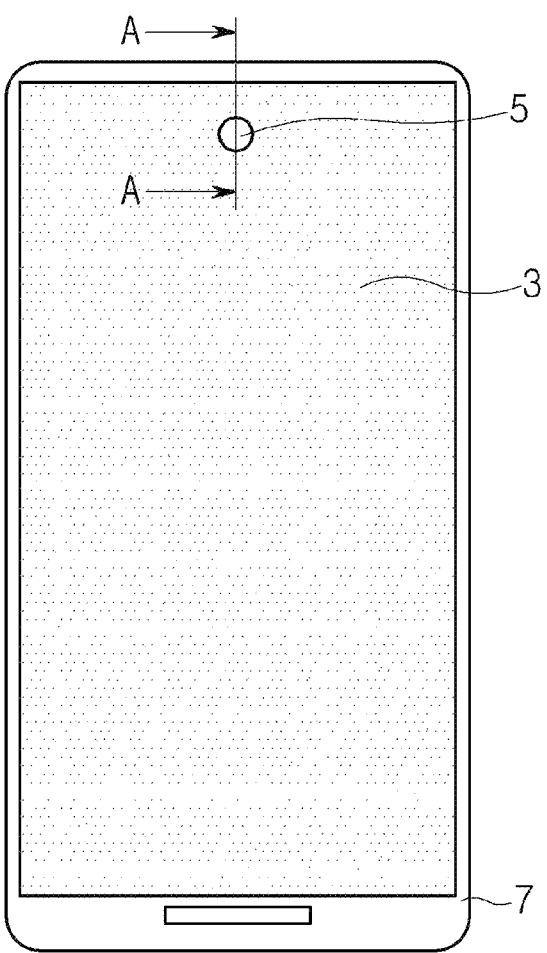
FIG. 1 is a front diagram illustrating a display device, according to an embodiment of the present disclosure.

As illustrated in FIG. 1, a display device 1 of the present disclosure is a hole-in-display type having a camera hole 5 in an active area of a display unit 3. When the camera hole 5 is provided in the active area of the display unit 3, a bezel 7 corresponding to the edge surrounding the display unit 3 can become thin, thereby implementing a simple design and enhancing the sense of immersion when viewing an image, etc.

The camera hole 5 can be provided in the center of the upper portion or one side of the upper portion of the display unit 3. Herein, the center of the upper portion or one side of the upper portion has been described based on the drawings. Then, since the direction and position indications used in the present specification are described based on the drawings, 'upper portion' can be described as 'upper surface' or 'front surface', and 'lower portion' can also be described as 'lower surface' or 'back surface' or 'rear surface', etc. according to the direction illustrated in the drawings.

Figure 2:
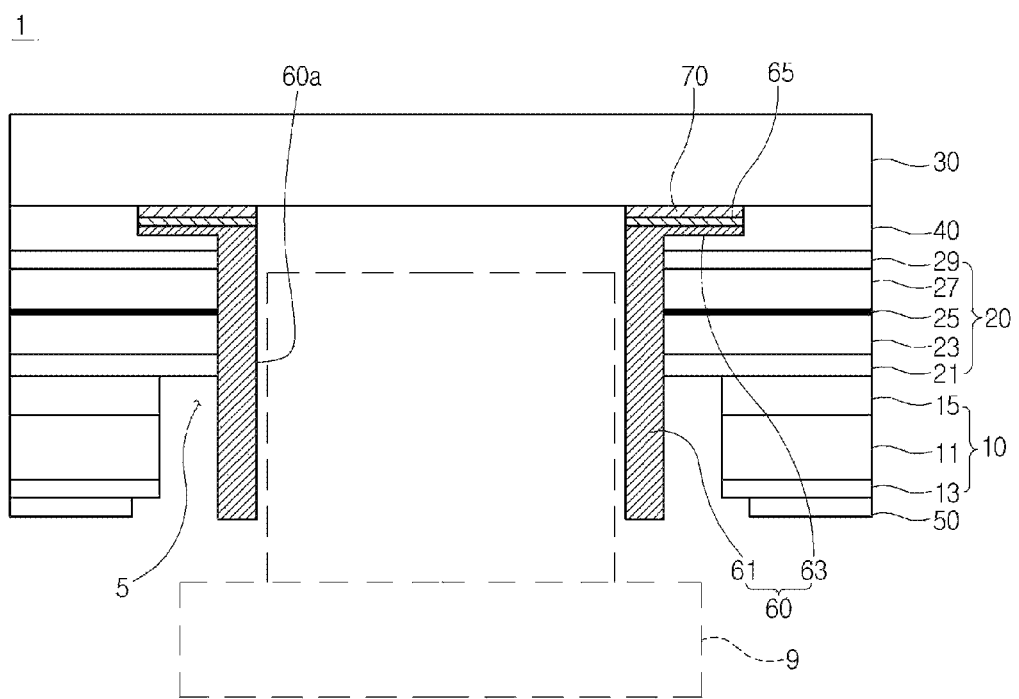
FIG. 2 is a cross-sectional diagram along A-A of FIG. 1, according to a first embodiment of the present disclosure.

As illustrated in FIG. 2, the display device 1 includes a backlight unit 10, a liquid crystal panel 20 installed on the backlight unit 10, and a cover glass 30 attached to the liquid crystal panel 20. In one embodiment, the liquid crystal panel 20 is between the cover glass 30 and the backlight unit 10 such that an upper surface of the backlight unit 10 is in contact with a lower surface of the liquid crystal panel 20 and a lower surface of the cover glass 30 is in contact with an upper surface of the liquid crystal panel 20.

The backlight unit 10 uniformly supplies light to the liquid crystal panel 20 so that an image can be visually recognized from the display unit 3, and the liquid crystal panel 20 outputs the image by using the light incident from the backlight unit.

The backlight unit 10 includes a light guide plate 11 and a light source (not illustrated). The light guide plate 11 uniformly disperses the light received from the light source positioned at a side surface or a lower surface to the liquid crystal panel 20. The light source may be an LED.

A reflective sheet 13 is positioned on a lower surface of the light guide plate 11 so that the light incident on the reflective sheet 13 is irregularly reflected and is emitted to an upper surface of the light guide plate 11 toward the liquid crystal panel 20. An optical sheet 15 for adjusting the light path is positioned on the upper surface of the light guide plate 11 so that the light passing through the light guide plate 11 is received into the liquid crystal panel 20 without loss. The optical sheet 15 performs diffusion, condensing, and protecting functions of the light passing through the light guide plate 11 to adjust it to uniform light having a specific direction required for the liquid crystal panel 20.

The liquid crystal panel 20 includes a lower polarizer POL 21, a TFT substrate 23, a liquid crystal layer LC 25, a color filter substrate CF 27 and an upper polarizer POL 29. The lower polarizer 21 is positioned on the upper surface of the backlight unit 10, and the TFT substrate 23, the liquid crystal layer 25, and the color filter substrate 27 are positioned between the lower polarizer 21 and the upper polarizer 29. In one embodiment, the positions of the TFT substrate 23 and the color filter substrate 27 can be changed with each other such that the TFT substrate 23 is closer to the cover glass 30 than the color filter 27.

The lower polarizer 21 and the upper polarizer 29 transmit or block the light to implement a color, and the TFT substrate 23 turns on and off a voltage as a switching element. The liquid crystal layer 25 transmits or blocks the light. When voltage is applied to the liquid crystal layer 25, the alignment of the liquid crystal layer 25 is changed to transmit or block the light. The color filter substrate 27 filters light emitted from the backlight unit 10 to generate light of a variety of colors using a combination of red, green, and blue. For example, the color filter substrate 27 may generate red light, green light, blue light, white light, and other colors using a combination of red light, green light, and blue light.

The light is emitted from the backlight unit 10 to pass through the lower polarizer 21, the TFT substrate 23 controls the liquid crystal layer 25 by appropriately adjusting the voltage, colors for images are generated while the light passes through the color filter substrate 27 through the liquid crystal layer 25, and the images (videos) are implemented through the upper polarizer 29 and the cover glass 30.

The cover glass 30 is attached to the liquid crystal panel 20 by using an adhesive film 40. The adhesive film 40 uses an Optically Clear Adhesive film (OCA).

A cover bottom 50 is positioned on the lower portion of the backlight unit 10. The cover bottom 50 is a frame for supporting the backlight unit 10 and the liquid crystal panel 20. The cover bottom 50 is made of a metal material, and can also be coated with ceramics or made of an aluminum material to dissipate the heat generated from the light source to the outside.

In order to implement the hole-in-display type, the camera hole 5 passes through the backlight unit 10 and the liquid crystal panel 20. When a camera 9 is inserted into the camera hole 5 that passes through the backlight unit 10 and the liquid crystal panel 20, only the cover glass 30 covers a front surface of a camera lens, thereby increasing the visible light transmittance and increasing the camera resolution. When the visible light transmittance is increased and the camera resolution is increased, it is possible to provide the user with a vivid and clear image.

The cover glass 30 is provided with a hole guide 60. The hole guide 60 functions as a light-leakage prevention means for preventing the light leakage in the region of the camera hole. The hole guide 60 is fixed to the cover glass 30 and is positioned in the camera hole 5 to form a guide hole 60a into which the camera 9 is inserted, thereby preventing the light leakage into an edge region of the camera hole 5.

When the camera hole 5 is formed by passing through the backlight unit 10 and the liquid crystal panel 20, the visible light transmittance is increased and the camera resolution is improved, but light-leakage phenomenon can cause light leakage into the camera hole 5. When the light-leakage phenomenon occurs in the edge region of the camera hole 5, not only is the appearance quality deteriorated but also the image quality is distorted. Therefore, the cover glass 30 is provided with the hole guide 60, thereby preventing the light leakage in the edge region of the camera hole 5.

The hole guide 60 includes a body portion 61 of a hollow cylindrical shape having the outer diameter corresponding to the camera hole 5 and a flange 63 on an upper portion of the body portion 61 that is attached to the back surface of the cover glass 30 corresponding to the region of the camera hole 5. The flange 63 extends away (i.e., protrudes) from the hole along the cover glass 30 in one embodiment.

The hole guide 60 has a hollow cylindrical region corresponding to the guide hole 60a, and a diameter of the guide hole 60a corresponds to the outer diameter of the camera 9. The body portion 61 of the hole guide 60 extends from the cover glass 30 through the liquid crystal panel 20 and the backlight unit 10 in the camera hole 5. The body portion 61 of the hole guide 60 surrounds the camera 9 inserted into the camera hole 5 and shields light from the backlight unit 10 and the liquid crystal panel 20 from entering the camera hole 5, thereby preventing the light leakage.

Figure 3A:
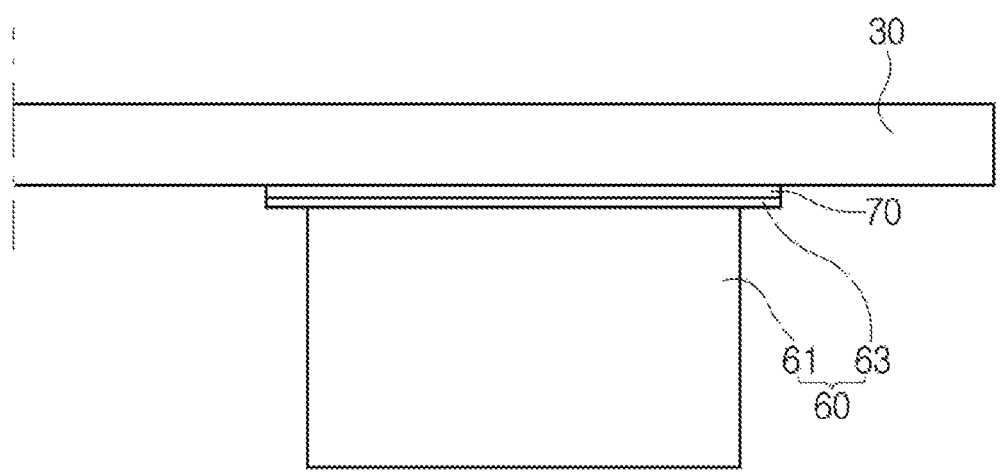
FIG. 3A is a side diagram illustrating a hole guide and a cover glass, according to an embodiment of the present disclosure.
Figure 3B:
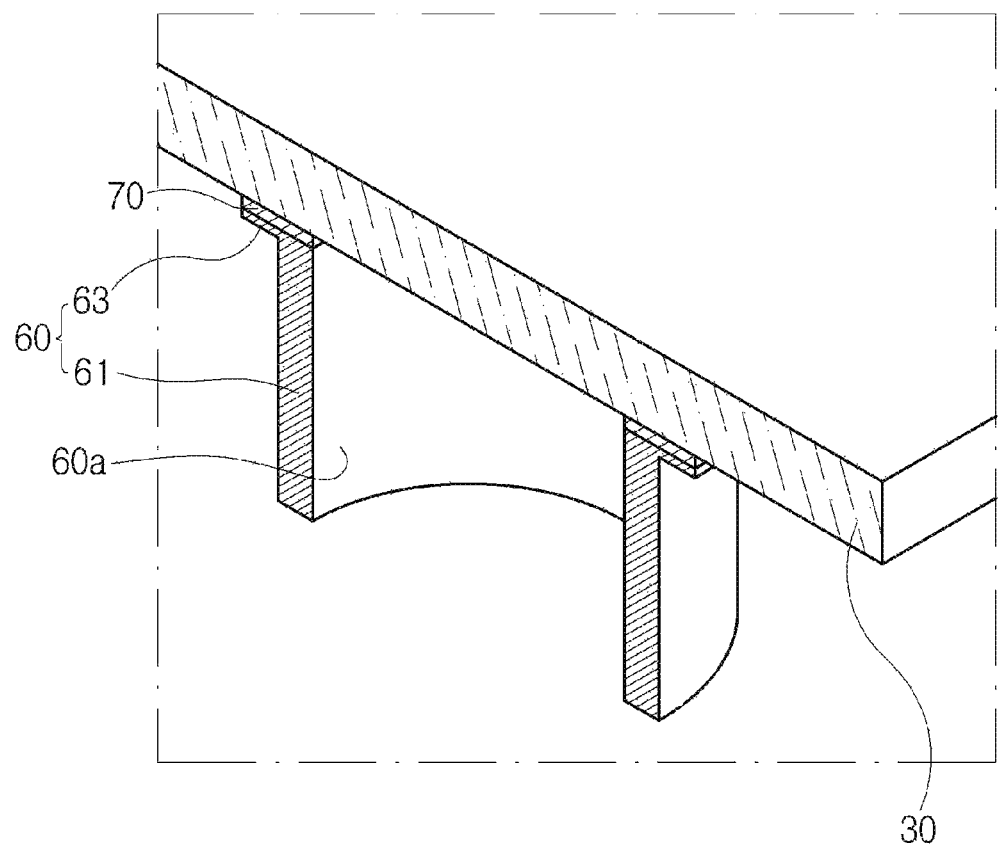
FIG. 3B is a longitudinal cross-sectional diagram of FIG. 3A, according to an embodiment of the present disclosure.

As illustrated in FIGS. 3A and 3B, the hole guide 60 is integrally formed with the cover glass 30 and then manufactured as a structure. The hole guide 60 is inserted into the camera hole 5 when the cover glass 30 is assembled with the liquid crystal panel 20. When the hole guide 60 is manufactured as a structure integrally formed with the cover glass 30, the hole guide 60 covers the connection portion between the cover glass 30 and the camera hole 5, thereby increasing the light-leakage prevention efficiency. The hole guide 60 is made of an opaque material in order to prevent the light leakage.

As illustrated in FIG. 2, the hole guide 60 can be integrated by attaching a portion of the flange 63 to the cover glass 30 through an adhesive film 65. The adhesive film 65 can be a double-sided adhesive tape.

A first light-leakage prevention layer 70 made of a black material is provided between the flange 63 of the hole guide 60 and the cover glass 30. The first light-leakage prevention layer 70 is intended to prevent the light leakage from occurring through the attachment portion of the flange 63 and the cover glass 30.

The first light-leakage prevention layer 70 is formed by printing a black ink on the back surface of the cover glass 30 where the flange 63 is attached. Specifically, the first light-leakage prevention layer 70 is formed by printing a black ink on a portion where the flange 63 of the back surface of the cover glass 30 is attached, and the flange 63 of the hole guide 60 is attached to the first light-leakage prevention layer 70 through the adhesive film 65 to integrate the hole guide 60 with the cover glass 30.

Figure 4:
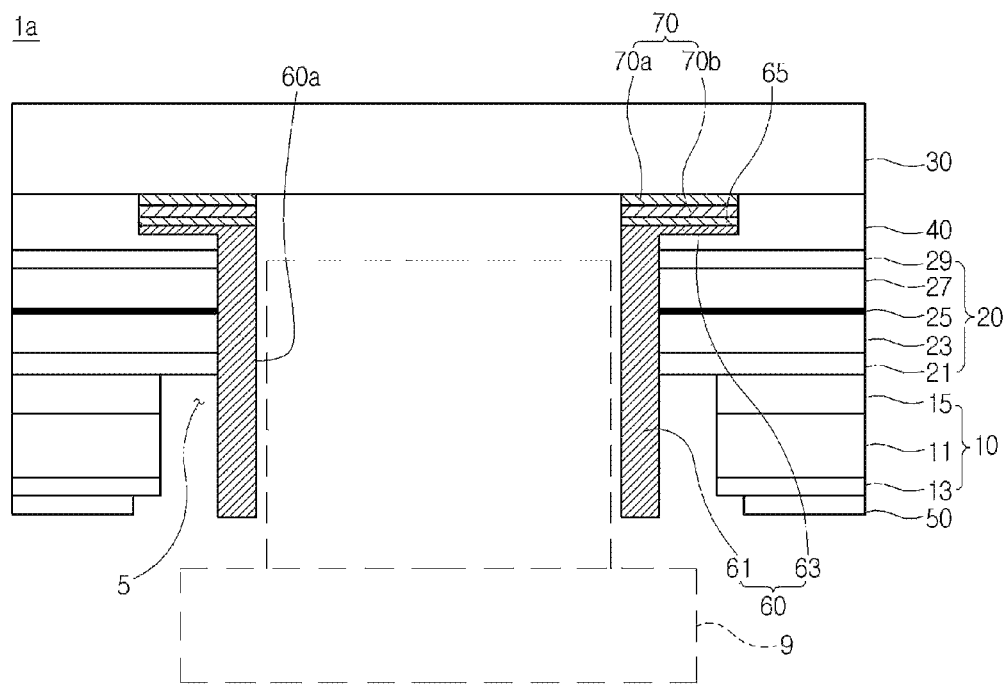
FIG. 4 is a cross-sectional diagram illustrating another embodiment of the portion along A-A of FIG. 1.

In another embodiment, as illustrated in FIG. 4, a display device 1a can have two or more layers of the first light-leakage prevention layers 70. Two or more layers of the first light-leakage prevention layers 70 are intended to improve the appearance quality and increase the light-leakage prevention efficiency through the step-difference compensation effect. The first light-leakage prevention layers 70a, 70b can be formed by printing two or more layers of the black inks on the back surface of the cover glass 30 where the flange 63 is attached.

When the black ink is printed with two or more layers, there is better coverage in a portion where the cover glass 30 and the flange 63 are attached, which improves light leakage prevention.

In addition, the first light-leakage prevention layer 70 made of the black ink has a flat surface on the back surface of the cover glass 30 without protrusion due to the ink lump to stably contact the flange 63, thereby improving the attachment force with the cover glass 30 and also improving the durability of the display device 1a.

Alternatively, the first light-leakage prevention layer 70 can also be formed by coating any one of the paints or the coating materials having a color of the series similar to the black ink on the back surface of the cover glass 30.

Figure 5:
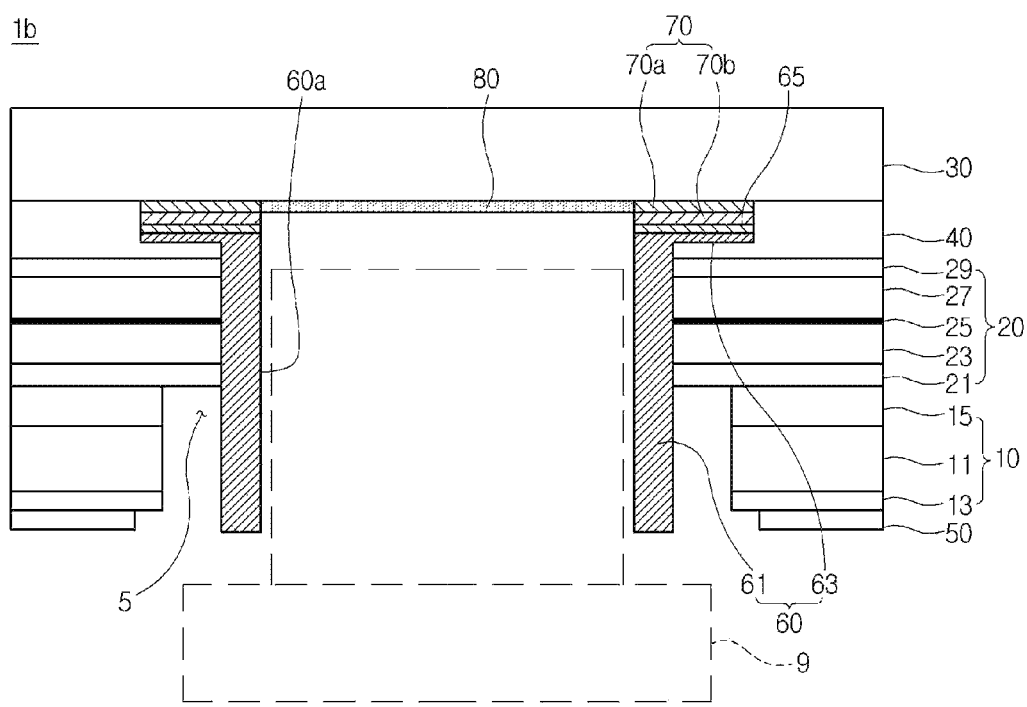
FIG. 5 is a cross-sectional diagram illustrating still another embodiment of the portion along A-A of FIG. 1.

In still another embodiment, as illustrated in FIG. 5, a display device 1b can further include an antireflective layer 80 on the cover glass 30. The antireflective layer 80 is provided on the back surface corresponding to the region of the camera hole 5 of the cover glass 30.

Specifically, the antireflective layer 80 can be formed on the back surface of the cover glass 30 corresponding to the region of the guide hole 60a of the hole guide 60 attached to the cover glass 30. The antireflective layer 80 is intended to improve the reflectance.

The antireflective layer 80 can be formed by applying the AR (Anti-reflective) coating to the back surface of the cover glass 30.

The antireflective layer 80 reduces the reflectance of light to increase the transmission efficiency and prevents the glare effect to reduce the eye fatigue. The antireflective layer 80 is a thin film and can be formed in multiple layers.

In the embodiment, the antireflective layer 80 for reducing the reflectance of light incident from the outside is formed at a position corresponding to the guide hole 60a in the cover glass 30 where the hole guide 60 is attached, the first light-leakage prevention layer 70 for preventing the light leakage of the light provided from the backlight unit 10 is formed at the edge of the antireflective layer 80, and the flange 63 of the hole guide 60 is attached to the first light-leakage prevention layer 70 through the adhesive film 65.

Figure 6:
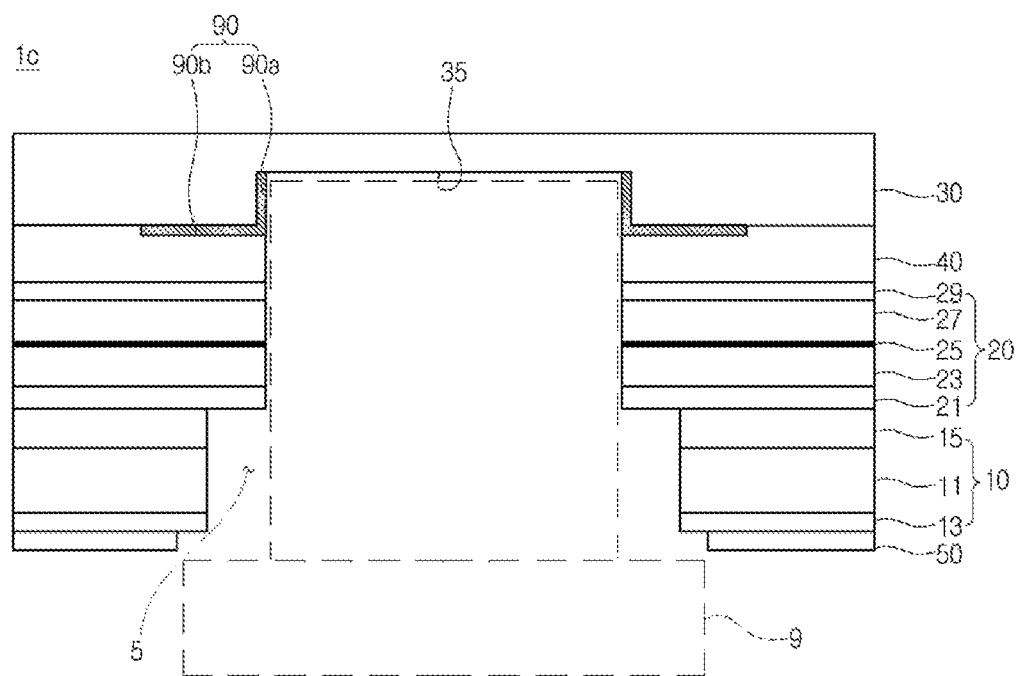
FIG. 6 is a cross-sectional diagram illustrating yet another embodiment of the portion along A-A of FIG. 1.

In yet another embodiment, as illustrated in FIG. 6, a display device 1c can be formed with a fixing groove 35 recessed in the cover glass 30 for inserting a front end of the camera 9 through the camera hole 5. The fixing groove 35 is formed on the back surface of the cover glass 30, and a thickness of a portion of the cover glass 30 corresponding to the fixing groove 35 is less than a thickness of a portion of the cover glass 30 surrounding the fixing groove 35.

A second light-leakage prevention layer 90a is provided on the inner wall of the fixing groove 35. The second light-leakage prevention layer 90b is also formed between the liquid crystal panel 20 and the cover glass 30 to be connected with the second light-leakage prevention layer 90a of the inner wall of the fixing groove 35.

The fixing groove 35 has a diameter that is greater than or equal to the outer diameter of the front end of the camera 9. The fixing groove 35 is formed by applying an engraved polishing to the back surface of the cover glass 30. The fixing groove 35 is formed by performing the polishing in order to have the diameter corresponding to the outer diameter of the front end of the camera 9 so that the front end of the camera 9 can be fixed onto the fixing groove 35.

The cover glass 30 where the fixing groove 35 is formed fixes the front end of the camera 9, and the second light-leakage prevention layer 90 provided on the inner wall of the fixing groove 35 and between the liquid crystal panel 20 and the cover glass 30 functions as a light-leakage prevention means for preventing the light leakage in the edge region of the camera hole.

In the embodiment, the second light-leakage prevention layer 90 is formed by coating the black ink or printing the black ink from the inner wall of the fixing groove 35 of the cover glass 30 to a portion corresponding to the edge of the fixing groove 35.

A light-leakage prevention principle is that although the light leakage occurs from the edges of the upper polarizer 29 and the color filter substrate 27 due to the formation of the camera hole 5 passing through the backlight unit 10 and the liquid crystal panel 20, the front end of the camera 9 is further inserted into the fixing groove 35 of the cover glass 30, and the second light-leakage prevention layer 90a is formed on the inner wall of the fixing groove 35, thereby fundamentally blocking the light received into the upper polarizer 29, the color filter substrate 27, etc.

When there is no fixing groove in the cover glass, light leakage may occur at an edge between the upper polarizer 29 and the color filter substrate 27, and the camera hole 5. Light may enter through an aperture of the camera 9, such that image quality distortion phenomenon of the camera 9 occurs. In addition, the periphery of the camera is visually recognized as white due to the light leakage.

For this reason, the engraved fixing groove 35 is formed in the cover glass 30 and the front end of the camera 9 is inserted into the fixing groove 35, thereby preventing the light leakage occurred from the upper polarizer 29 and the color filter substrate 27 from being received into the aperture of the camera 9, and the second light-leakage prevention layers 90a, 90b are formed on the inner wall of the fixing groove 35 and the cover glass 30 connected with the inner wall of the fixing groove 35, thereby fundamentally blocking the light leakage.

At this time, the fixing groove 35 formed in the cover glass 30 functions as a guide when the camera 9 is assembled with the camera hole 5, thereby improving the assembling efficiency, and the manufacture can be easy, thereby simplifying the manufacturing process of the display device and reducing the cost.

As described above, the yet another embodiment illustrated in FIG. 6 can block the light received into the camera from the outside, thereby preventing the image quality distortion phenomenon of the camera. In addition, the light cannot be leaked to the outside of the display device, thereby preventing the phenomenon that a white edge is visually recognized when the camera portion is visually inspected from the outside. In addition, the front end of the camera 9 can be fixed to the fixing groove 35 without a separate structure for fixing the camera 9, thereby improving the assembling efficiency of the camera 9 and also reducing the cost by simplifying the process.

Figure 7:
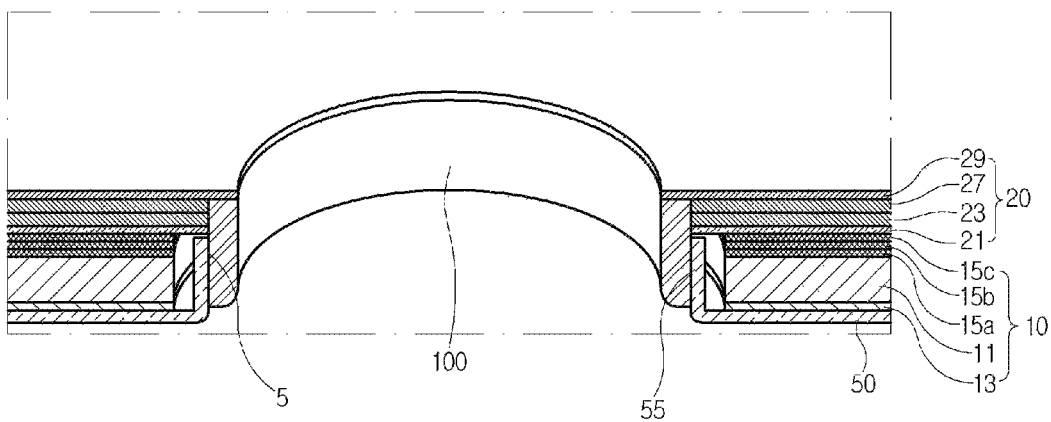
FIG. 7 is a cross-sectional perspective diagram illustrating a bending portion and a glue wall along A-A of FIG. 1, according to an embodiment of the present disclosure.

In still yet another embodiment, as illustrated in FIG. 7, a display device 1d can include a bending portion 55 and a glue wall 100 as a light-leakage prevention means.

The bending portion 55 is applied to the cover bottom 50 positioned on the back surface of the backlight unit 10, and the cover bottom 50 is bent in the L shape at a position corresponding to the camera hole 5 to be positioned in the camera hole 5.

The bending portion 55 is positioned to be corresponded to the section of the camera hole 5 of the backlight unit 10. The bending portion 55 extends along the camera hole 5 through the backlight unit 10. The bending portion 55 prevents the light leakage and the inflow of foreign matters occurred at the side wall of the viewing angle of the camera hole 5 passing through the backlight unit 10.

The glue wall 100 forms a hole corresponding to the outer diameter of the camera and covers the bending portion 55 positioned in the camera hole 5. The glue wall 100 is formed by filling the camera hole 5 with glue and then cutting the glue 100a with the laser. When the glue wall 100 is formed by filling the camera hole 5 with the glue 100a and then cutting it by the laser, the glue wall has neat and accurate dimensions as compared to forming the glue wall by injecting the glue into the camera hole 5 by using a syringe.

The bending portion 55 and the glue wall 100 prevent the light provided from the backlight unit 10 from being received into the camera hole 5.

That is, in the hole-in-display type, the bending portion 55 where the cover bottom 50 has been bent in the L shape in the camera hole 5 and the glue wall 100 formed by cutting the glue 100a filled in the camera hole 5 by the laser seal the portions of the backlight unit 10 and the liquid crystal panel 20 in the region of the camera hole 5. The bending portion 55 and the glue wall 100 prevent light leakage and prevent inflow of foreign matter.

The glue wall 100 can be formed in various methods. For example, the glue wall 100 can be formed in the entire camera hole 5 to pass through the backlight unit 10 and the liquid crystal panel 20, or formed only in the portion of the camera hole 5 that passes through the backlight unit 10.

Figure 8:
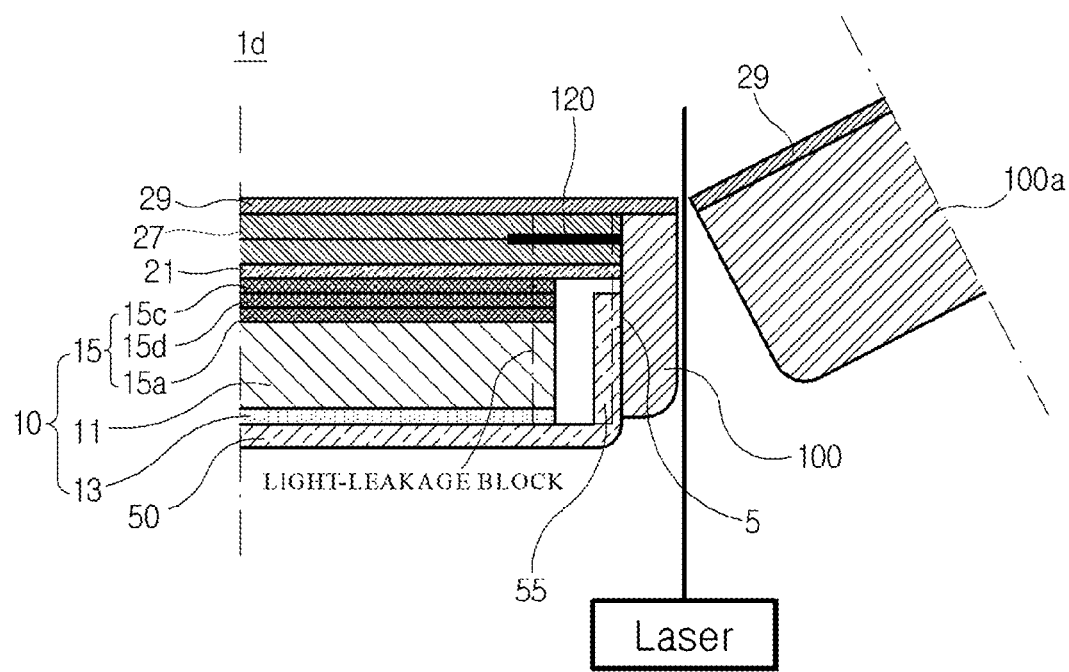
FIG. 8 is a cross-sectional diagram illustrating a method for forming the glue wall of FIG. 7, according to one embodiment of the present disclosure.

In an embodiment, as illustrated in FIG. 8, the bending portion 55 of the cover bottom 50 bends in a L shape at a position corresponding to the camera hole 5. The bending portion 55 extends into the cameral hole 5. The camera hole passes through the backlight unit 10 and the liquid crystal panel 20 until a lower surface of the upper polarizer 29. Next, the camera hole 5 is filled with the glue 100a in order to cover the bending portion 55. At this time, since the upper polarizer 29 functions as a cover for covering the camera hole 5, the camera hole 5 is filled with the glue 100a. When the glue 100a filled in the camera hole 5 is dried, the glue wall 100 is formed by cutting the glue 100a inside the camera hole 5.

The glue wall 100 formed by the method of FIG. 8 is formed to contact the upper polarizer 29 while covering the bending portion 55. That is, when the glue 100a filled in the camera hole 5 is cut by the laser, the glue 100a and the upper polarizer 29 are simultaneously cut to form the glue wall 100 having the upper surface finished with the upper polarizer 29.

The color filter substrate 27 is provided with a third light-leakage prevention layer BM 120 for blocking the light between cells. The third light-leakage prevention layer 120 functions as a color boundary line between the color filter substrates. For example, the third light-leakage prevention layer 120 can be made of a material such as a black matrix (BM), a black ink, etc.

Figure 9:
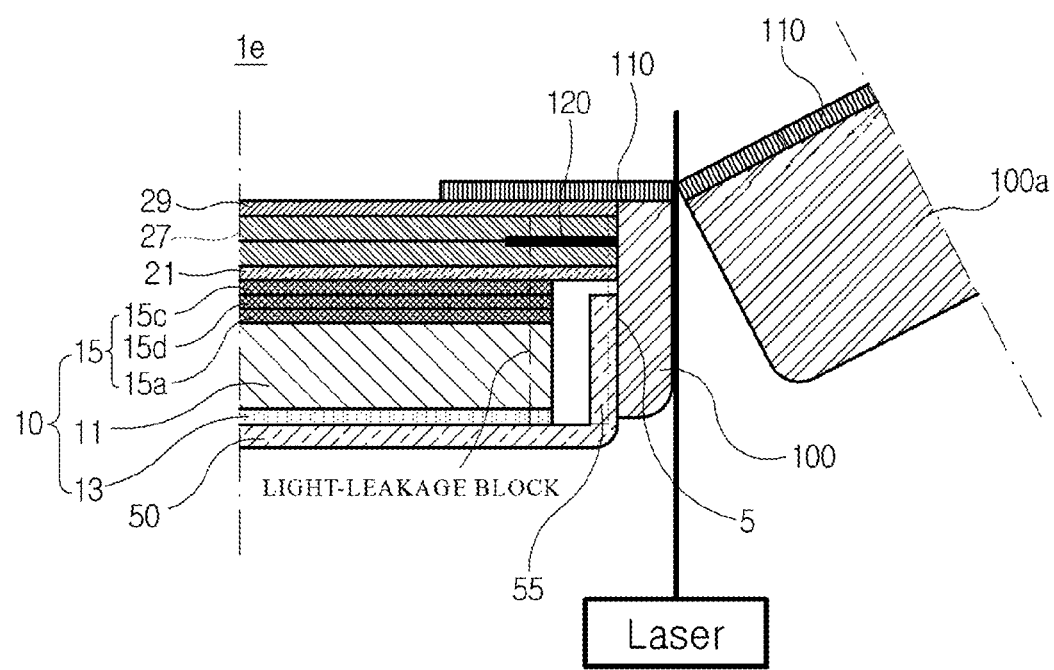
FIG. 9 is a cross-sectional diagram illustrating a method for forming the glue wall of FIG. 7, according to one embodiment of the present disclosure.

In another embodiment, as illustrated in FIG. 9, the camera hole 5 is formed to pass through the upper polarizer 29 in the liquid crystal panel 20, a cover film 110 for covering the camera hole 5 is attached to the upper polarizer 29 and the cover film 110 functions as a cover for covering the camera hole 5.

The bending portion 55, which has bent one side of the cover bottom 50 in the L shape at a position corresponding to the camera hole 5, is formed, the camera hole 5 is formed to pass through the backlight unit 10 and the liquid crystal panel 20, and the cover film 110 for covering the camera hole 5 is attached to the upper polarizer 29. Next, the camera hole 5 of the backlight unit 10 and the liquid crystal panel 20 is filled with the glue 100a in order to cover the bending portion 55.

According to the method of FIG. 9, the camera hole 5 is filled with the glue 100a, and when the glue 100a filled in the camera hole 5 is cut by the laser after drying, the glue 100a and the cover film 110 are simultaneously cut to form the glue wall 100 having the upper surface finished with the cover film 110. The cover film 110 can use a PET (polyethylene terephthalate) film. After the glue wall 100 is formed, the cover film 110 is removed from the glue wall 100.

Since the glue wall 100 formed by the method of FIG. 9 becomes a structure that also seals the upper polarizer 29, the light-leakage blocking effect is better than the method of FIG. 8.

Figure 10:
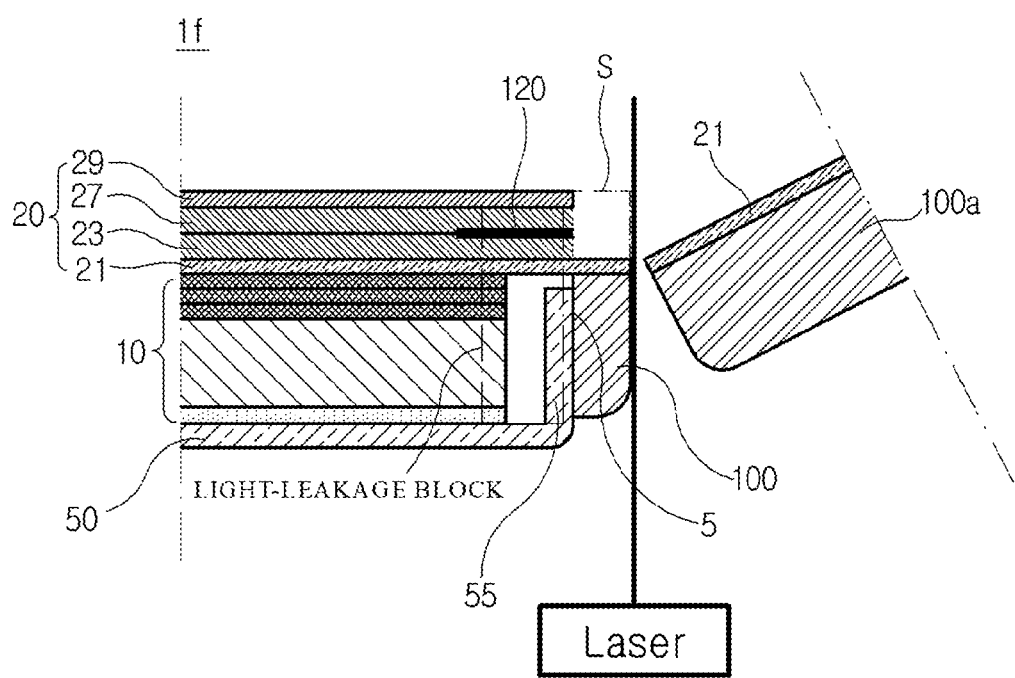
FIG. 10 is a cross-sectional diagram illustrating still another embodiment of a method for forming the glue wall of FIG. 7, according to one embodiment of the present disclosure.

In still another embodiment, as illustrated in FIG. 10, the camera hole 5 is formed except for the lower polarizer 21 in the liquid crystal panel 20, and when the camera hole 5 is filled with the glue 100a, the lower polarizer 21 functions as a temporary cover for covering the camera hole 5 formed in the backlight unit 10.

The bending portion 55, which has bent the cover bottom 50 in the L shape at a position corresponding to the camera hole 5, is formed, and the camera hole 5 passes through the backlight unit 10 and is formed except for the lower polarizer 21 in the liquid crystal panel 20. Next, the camera hole 5 of the backlight unit 10 is filled with the glue 100a in order to cover the bending portion 55.

According to the method of FIG. 10, the camera hole 5 is filled with the glue 100a, and when the glue 100a filled in the camera hole 5 is cut by the laser after drying, the glue 100a and the lower polarizer 21 are simultaneously cut to form the glue wall 100 having the upper surface finished with the lower polarizer 21 and corresponding to the camera hole 5 of the backlight unit 10. That is, a portion of the lower polarizer 21 extends toward the hole and contacts a surface of the glue wall 100.

The glue wall 100 finishes the side wall of the camera hole 5 of the backlight unit 10, thereby blocking the occurrence of the light leakage in the edge region of the camera hole.

When the glue wall 100 is formed by the method of FIG. 10, a free space S is formed at a position corresponding to the glue wall 100 in the camera hole 5 of the liquid crystal panel 20, thereby utilizing the free space S in order to enlarge the camera attachment region, etc. The free space S is above the portion of the lower polarizer 21 extending toward the hole and the glue wall 100.

Hereinafter, an operation of the present disclosure will be described.

The present disclosure provides the hole guide 60 having the protrusion-type structure in the cover glass 30, thereby preventing the light leakage in the edge region of the camera hole 5.

The hole guide 60 is integrally formed with the cover glass 30 and then, manufactured as a structure, is inserted into the camera hole 5 when the cover glass 30 is assembled with the liquid crystal panel 20, and covers the connection portion between the cover glass 30 and the camera hole 5, thereby preventing the light leakage.

In addition, one or more layers of the first light-leakage prevention layers 70 made of the black material are provided on the attachment surface between the hole guide 60 and the cover glass 30, thereby preventing the light leakage through the attachment surface.

In addition, the AR coating can be applied to the back surface of the cover glass 30 to form the antireflective layer 80, thereby reducing the reflectance of light and improving the transmission efficiency.

Alternatively, the present disclosure forms the fixing groove 35 in the cover glass 30, and inserts the camera into the fixing groove 35, thereby preventing the light leakage in the edge region of the camera hole 5.

The present disclosure forms the engraved fixing groove 35 in the cover glass 30 by polishing, and inserts the front end of the camera 9 into the fixing groove 35, thereby preventing the light leakage from the upper polarizer 29 and the color filter substrate 27 into the aperture of the camera 9.

In addition, the present disclosure forms the second light-leakage prevention layers 90a, 90b on the inner wall of the fixing groove 35 and the cover glass 30 connected with the inner wall of the fixing groove 35, thereby blocking the light leakage.

Alternatively, the present disclosure forms the glue wall 100 in the camera hole 5, thereby preventing the light leakage in the edge region of the camera hole 5.

The glue wall 100 formed in the camera hole 5 is formed by filling the camera hole 5 with the glue 100a and then cutting it with the laser to provide the dimensional stability and the improved appearance, thereby improving the appearance quality in the region of the camera hole.

Meanwhile, the appearance and the presence and absence of the occurrence of the light leakage between the display device of the present disclosure forming the glue wall and the display device of the current structure without the glue wall were evaluated.

As a result of the evaluation, it was confirmed that the display device of the present disclosure forming the glue wall had improved appearance and no light leakage in the camera hole.

On the contrary, it was confirmed that in the display device of the current structure having no glue wall, the light leakage occurred in the edge region of the camera hole.

This means that in the display device of the hole-in-display type where the camera hole is formed by passing through the backlight unit and the liquid crystal panel, the bending portion and the glue wall can be formed in the camera hole to cover the side wall of the camera hole, thereby preventing the light leakage in the camera hole and also improving the appearance quality.

The above-described present disclosure is applicable in combination of one or more embodiments.

In addition, the display device of the present disclosure is applicable not only to a mobile display but also to an LCD TV, a navigation system, a DMB, a monitor, etc.

According to the present disclosure, when the cover glass is assembled with the liquid crystal panel by applying the hole guide to the cover glass, it is possible to insert the hole guide into the camera hole and cover the connection portion between the cover glass and the camera hole, thereby preventing the light leakage in the edge region of the camera hole, to form the engraved fixing groove in the cover glass by polishing and insert the camera into the fixing groove, thereby preventing the light leakage in the edge region of the camera hole, or to form the glue wall in the camera hole, thereby preventing the light leakage in the edge region of the camera hole.

Therefore, according to the present disclosure, it is possible to pass through the backlight unit and the liquid crystal panel to form the camera hole in the hole-in-display type, thereby preventing the light leakage in the region of the camera hole and improving the appearance quality of the display device even while increasing the visible light transmittance and increasing the resolution of the camera.

Although the specific terms have been used herein, they are only used for describing the present disclosure and are not used to limit the meaning or restrict the scope of the present disclosure described in the claims. Therefore, it will be understood by those skilled in the art that various modifications and other embodiments equivalent thereto can be made therefrom. Therefore, the true technical scope of the present disclosure should be determined by the technical spirit of the appended claims.

What is claimed is:

1. A display device, comprising:
   a backlight unit;
   a liquid crystal panel on the backlight unit;
   a hole in both the backlight unit and the liquid crystal panel;
   a camera positioned in the hole;
   a cover glass attached to the liquid crystal panel, the cover glass covering the hole; and
   a light-leakage prevention means in contact with the cover glass and at least partially surrounding the hole, the light-leakage prevention means reducing light leakage into the hole,
   wherein the light-leakage prevention means comprises a hole guide, the hole guide including:
      a body portion having a hollow cylindrical shape with an outer diameter corresponding to a diameter of the hole; and
      a flange at one end of the body portion, the flange attached to the cover glass and extending away from the hole along the cover glass in a direction that is perpendicular to the body portion, and
   wherein the display device further comprises:
      a light-leakage prevention layer comprising one or more layers of black material and coated or printed on a bottom surface of the cover glass, the light-leakage prevention layer positioned between the flange and the cover glass; and
      an adhesive film positioned between the light-leakage prevention layer and the flange.

2. The display device of claim 1, wherein the hole guide is in contact with the cover glass and positioned in the hole, the hole guide surrounding the camera and reducing the light leakage into the camera.

3. The display device of claim 2, further comprising:
   an antireflective layer on a portion of the cover glass, the antireflective layer covering the hole.

4. The display device of claim 1, wherein the light-leakage prevention means comprises:
   a fixing groove recessed in the cover glass, wherein a front end of the camera is inserted into the fixing groove, and wherein a thickness of a portion of the cover glass overlapping the fixing groove is less than a thickness of a portion of the cover glass that is non-overlapping with the fixing groove.

5. The display device of claim 4, further comprising:
   a light-leakage prevention layer on an inner wall of the fixing groove in the cover glass.

6. The display device of claim 5, wherein a portion of the light-leakage prevention layer is between the liquid crystal panel and the cover glass.

7. The display device of claim 4, wherein the fixing groove has a same diameter as an outer diameter of the camera.

8. The display device of claim 1, wherein the light-leakage prevention means comprises a cover bottom, wherein a first portion of the cover bottom is on a surface of the backlight unit and a second portion of the cover bottom bends into the hole.

9. The display device of claim 8, wherein the second portion of the cover bottom extends along a portion of a length of the hole through the backlight unit.

10. The display device of claim 8, further comprising:
    a glue wall covering the second portion of the cover bottom in the hole.

11. The display device of claim 10, further comprising a polarizer that covers the camera hole, wherein a surface of the glue wall contacts the polarizer.

12. The display device of claim 10, further comprising:
    a polarizer overlapping the hole; and
    a cover film on the polarizer, the cover film overlapping the hole,
    wherein a surface of the glue wall contacts the cover film.

13. The display device of claim 12, wherein the cover film is a polyethylene terephthalate (PET) film.

14. The display device of claim 10, further comprising:
    a polarizer on the backlight unit, the polarizer extending into the hole and contacting a surface of the glue wall.

15. The display device of claim 14, wherein a free space is formed above a portion of the polarizer that extends into the hole and the glue wall.

16. A display device, comprising:
    a backlight unit in an active area of the display device, the active area of the display device displaying an image;
    a liquid crystal panel on the backlight unit;
    a hole in the active area of the display device, the hole through both the backlight unit and the liquid crystal panel;
    a camera positioned in the hole;
    a light-leakage prevention means at least partially surrounding the hole, the light-leakage prevention means reducing light leakage into the hole; and
    a cover glass attached to the liquid crystal panel, the cover glass covering the hole,
    wherein the light-leakage prevention means comprises a hole guide, the hole guide comprising:
       a body portion having a hollow cylindrical shape with an outer diameter corresponding to a diameter of the hole; and
       a flange at one end of the body portion, the flange attached to the cover glass and extending away from the hole along the cover glass in a direction that is perpendicular to the body portion; and
    wherein the display device further comprises:
       a light-leakage prevention layer comprising one or more layers of black material and coated or printed on a bottom surface of the cover glass, the light-leakage prevention layer positioned between the flange and the cover glass; and
       an adhesive film positioned between the light-leakage prevention layer and the flange.

17. The display device of claim 16, wherein the hole guide surrounds the camera and reduces the light leakage into the camera.

18. The display device of claim 16, wherein the light-leakage prevention means comprises:
- a fixing groove recessed in the cover glass, wherein a front end of the camera is inserted into the fixing groove, and wherein a thickness of a portion of the cover glass corresponding to the fixing groove is less than a thickness of a portion of the cover glass surrounding the fixing groove.

19. The display device of claim 16, wherein the light-leakage prevention means comprises a cover bottom, wherein a first portion of the cover bottom is on a surface of the backlight unit and a second portion of the cover bottom bends into the hole.

20. The display device of claim 19, further comprising:
- a glue wall covering the second portion of the cover bottom in the hole.

* * * * *